United States Patent
Ketlerius et al.

(10) Patent No.: US 11,738,716 B2
(45) Date of Patent: Aug. 29, 2023

(54) AUTOMOBILE RAIN AND TEMPERATURE SENSOR MODULE WITH TRANSPARENT COMPOUND CONTACTS THE TRANSPARENT COVER PLATE OF A HOUSING AND PARTICULARLY ENCASES THE LIGHT EMITTER AND LIGHT RECEIVER DISPOSED WITHIN

(71) Applicant: Littelfuse, Inc., Chicago, IL (US)

(72) Inventors: Mindaugas Ketlerius, Kaunas (LT); Mangirdas Rasiulis, Kaunas (LT); Paulius Alisauskas, Kaunas (LT)

(73) Assignee: Littelfuse, Inc., Chicago, IL (US)

(*) Notice: Subject to any disclaimer, the term of this patent is extended or adjusted under 35 U.S.C. 154(b) by 678 days.

(21) Appl. No.: 16/821,473

(22) Filed: Mar. 17, 2020

(65) Prior Publication Data

US 2020/0300775 A1    Sep. 24, 2020

Related U.S. Application Data

(60) Provisional application No. 62/820,980, filed on Mar. 20, 2019.

(51) Int. Cl.
*B60S 1/08* (2006.01)
*B60R 11/00* (2006.01)
(Continued)

(52) U.S. Cl.
CPC ............ *B60S 1/0833* (2013.01); *B60R 11/00* (2013.01); *B60S 1/0825* (2013.01);
(Continued)

(58) Field of Classification Search
CPC ........ B60S 1/08; B60R 11/00; B60R 2011/00; G01N 21/552
(Continued)

(56) References Cited

U.S. PATENT DOCUMENTS 4,589,771 A    5/1986   Watanabe et al.
6,285,037 B1   9/2001   Koyama et al.
(Continued)

FOREIGN PATENT DOCUMENTS

DE    102011101744    11/2012
EP      2407350 A2     1/2012
JP     2001330559 A    11/2001

OTHER PUBLICATIONS

Partial European Search Report dated Jul. 21, 2020 for corresponding European Patent Application No. 20164277.4.

*Primary Examiner* — Que Tan Le
(74) *Attorney, Agent, or Firm* — KDW Firm PLLC

(57) ABSTRACT

A rain and temperature sensing module including a housing having a cover plate formed of a transparent material, a printed circuit board disposed within the housing and having a light emitter, a light receiver, and a temperature sensing element disposed thereon, a transparent compound disposed within the housing and covering the light emitter, the light receiver, and the temperature sensing element, the transparent compound filling a space between the printed circuit board and the cover plate, wherein the transparent compound has a refractive index that is substantially equal to a refractive index of the cover plate, and wherein the transparent compound provides a thermally conductive medium between the cover plate and the temperature sensing element.

8 Claims, 2 Drawing Sheets

(51) Int. Cl.
    *G01K 7/02*      (2021.01)
    *G01K 7/16*      (2006.01)
    *G01K 13/00*    (2021.01)

(52) U.S. Cl.
    CPC ........... *B60S 1/0837* (2013.01); *B60S 1/0866* (2013.01); *B60S 1/0881* (2013.01); *B60S 1/0888* (2013.01); *G01K 7/02* (2013.01); *G01K 7/16* (2013.01); *G01K 13/00* (2013.01); *B60R 2011/0026* (2013.01); *G01N 2201/062* (2013.01)

(58) Field of Classification Search
    USPC ...................................... 250/221, 214 R, 239
    See application file for complete search history.

(56) References Cited

U.S. PATENT DOCUMENTS

| | | | |
|---|---|---|---|
| 6,376,824 B1 * | 4/2002 | Michenfelder | B60S 1/0833 250/214 R |
| 7,573,576 B2 * | 8/2009 | Mordau | G01N 21/552 356/239.8 |
| 8,434,359 B2 | 5/2013 | Niemann et al. | |
| 8,946,620 B2 * | 2/2015 | Loong | G01S 17/04 250/221 |
| 2017/0182978 A1 | 6/2017 | Backes | |

\* cited by examiner

AUTOMOBILE RAIN AND TEMPERATURE SENSOR MODULE WITH TRANSPARENT COMPOUND CONTACTS THE TRANSPARENT COVER PLATE OF A HOUSING AND PARTICULARLY ENCASES THE LIGHT EMITTER AND LIGHT RECEIVER DISPOSED WITHIN

CROSS-REFERENCES TO RELATED APPLICATIONS

This application claims the benefit of U.S. Provisional Patent Application No. 62/820,980, filed Mar. 20, 2019, which is incorporated by reference herein in its entirety.

FIELD OF THE DISCLOSURE

This disclosure relates generally to the field of automobile sensors, and more particularly to a rain and temperature sensor module configured to detect rainfall on, and to measure the temperature of, an automobile windshield.

BACKGROUND OF THE DISCLOSURE

Modern automobiles are commonly equipped with rain sensors that are configured to detect rainfall on an automobile's windshield. Information gathered from such sensors can be used to automatically activate and vary the speed of an automobile's windshield wipers and/or to control various other systems in an automobile (e.g., a traction control system). Modern automobiles are also commonly equipped with windshield temperature sensors that are configured to measure the temperature of an automobile's windshield. Information gathered from such sensors can be used to manage the operation of an automobile's automatic defogging system, for example.

In a typical implementation, an automobile rain sensor includes a light emitting element, a collimating lens adapted to collimate light emitted by the light emitting element and to direct the collimated light toward a sensing area on the windshield, a focusing lens adapted to receive the collimated light that is reflected off of the windshield and to focus the light, and a light receiving element (e.g., a photodiode) adapted to receive the focused light from the focusing lens and to convert the received light into an electrical output signal that is transmitted to a controller. If water (e.g., rain) is present at the sensing area on the exterior surface of the windshield, a portion of collimated light that strikes the sensing area will be refracted into the water instead of being reflected to the focusing lens. Thus, the amount of collimated light that is reflected off of the sensing area of the windshield and received by the light receiving element is generally attenuated relative to when the sensing area of the windshield is dry.

A shortcoming associated with conventional rain sensors of the type described above is that the collimating and focusing lenses of such sensors can be relatively expensive. Additionally, if it becomes necessary to change the configuration of the light emitting and light receiving elements in such sensors (e.g., in order suit various application environments in different vehicles), changes must generally also be made to the collimating and focusing lenses, the sensor housing, and the tooling used to manufacture the lenses and the housing. Such modifications are associated with significant time and expense.

An automobile windshield temperature sensor is commonly included as part of an integrated temperature and humidity sensing device that is implemented in a module alongside an automobile rain sensor of the type described above. A typical automobile windshield temperature sensor includes a temperature sensing element (e.g., a negative temperature coefficient element, a resistance temperature detector, a temperature and humidity sensing integrated circuit, a thermocouple, etc.) that is spring-biased against the windshield of an automobile. The various mechanical components of such sensors (e.g., springs, flexible circuit boards, etc.) are associated with significant cost and space requirements and are also subject to mechanical failure over time.

It is with respect to these and other considerations that the present improvements may be useful.

SUMMARY

This Summary is provided to introduce a selection of concepts in a simplified form further described below in the Detailed Description. This Summary is not intended to identify key features or essential features of the claimed subject matter, nor is the summary intended as an aid in determining the scope of the claimed subject matter.

A rain sensing module in accordance with an exemplary embodiment of the present disclosure includes a housing having a cover plate formed of a transparent material, a printed circuit board disposed within the housing and having a light emitter and a light receiver disposed thereon, wherein the light receiver is configured to receive light emitted by the light emitter and reflected off of an automobile windshield, and a transparent compound disposed within the housing and filling a space between the printed circuit board and the cover plate.

A windshield temperature sensing module in accordance with an exemplary embodiment of the present disclosure includes a housing having a cover plate adapted to be mounted to a windshield of an automobile, a printed circuit board disposed within the housing and having a temperature sensing element disposed thereon, and a compound disposed within the housing and filling a space between the printed circuit board and the cover plate, wherein the compound provides a thermally conductive medium between the cover plate and the temperature sensing element.

A rain and temperature sensing module in accordance with an exemplary embodiment of the present disclosure may include a housing having a cover plate formed of a transparent material, a printed circuit board disposed within the housing and having a light emitter, a light receiver, and a temperature sensing element disposed thereon, and a transparent compound disposed within the housing and filling a space between the printed circuit board and the cover plate, wherein the transparent compound provides a thermally conductive medium between the cover plate and the temperature sensing element.

DETAILED DESCRIPTION

An automobile rain and temperature sensor module in accordance with the present disclosure will now be described more fully with reference to the accompanying drawings, in which a preferred embodiment of the automobile rain and temperature sensor module is presented. The automobile rain and temperature sensor module may, however, be embodied in many different forms and should not be construed as being limited to the embodiments set forth herein. Rather, these embodiments are provided so that this disclosure will convey certain exemplary aspects of the automobile rain and temperature sensor module to those skilled in the art.

Figure 1A:
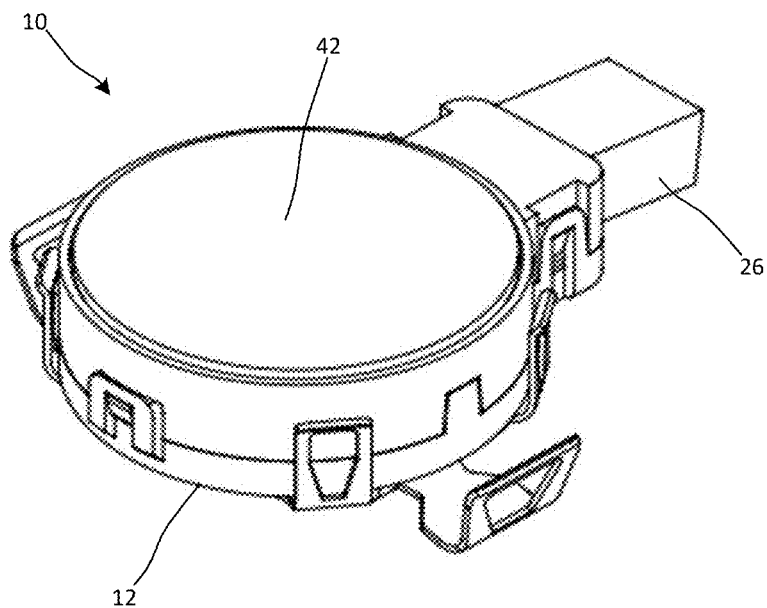
FIG. 1A is perspective view illustrating a rain and temperature sensing module in accordance with an embodiment of the present disclosure.
Figure 1B:
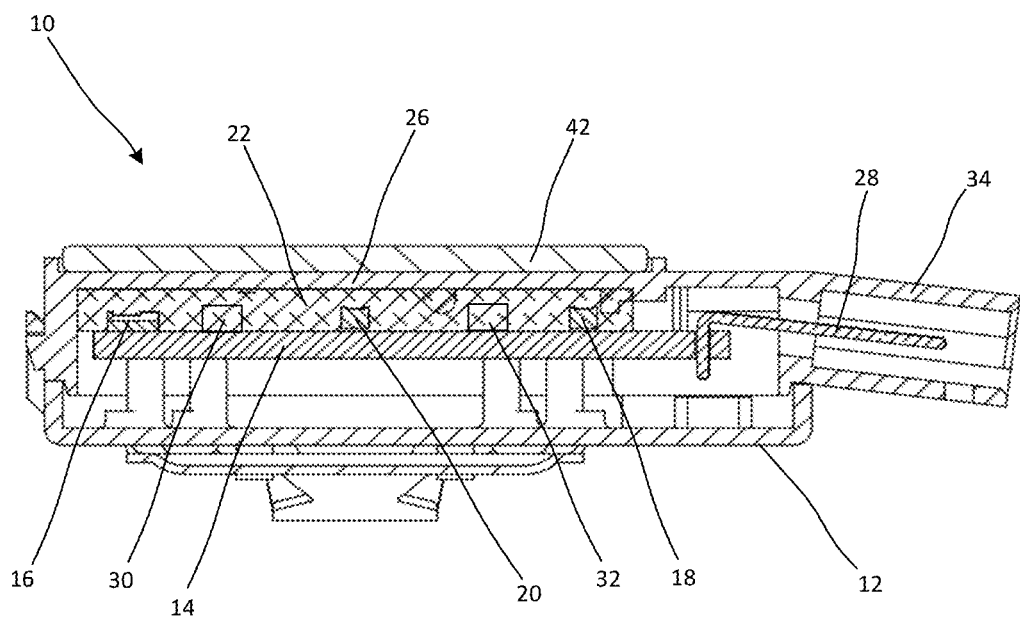
FIG. 1B is cross-sectional side view illustrating the rain and temperature sensing module of FIG. 1A.

Referring to FIGS. 1A and 1B, a perspective view and a cross-sectional view illustrating an automobile rain and temperature sensor module (hereinafter "the module 10") in accordance with an exemplary embodiment of the present disclosure are shown. In the depicted, non-limiting embodiment, the module 10 may generally include a housing 12 that contains a printed circuit board (PCB) 14, a light emitter 16, a light receiver 18, a temperature sensing element 20, and a transparent compound 22. While the module 10 is shown as including only a single light emitter 16 and a single light receiver 18, it will be understood that the module 10 may include a greater number of light emitters and/or light receivers without departing from the scope of the present disclosure.

The housing 12 of the module 10 may generally be formed of an opaque plastic but may include a cover plate 26 formed of a transparent material that allows light to enter the interior of the housing 12. In a non-limiting embodiment, the cover plate 26 may be formed of plastic that may be substantially transparent to infrared light but substantially opaque to visible light. The present disclosure is not limited in this regard.

The PCB 14 may be mounted to an interior of the housing 12 adjacent to, and in a substantially parallel relationship with, the cover plate 26. The light emitter 16, light receiver 18, and temperature sensing element 20 may be disposed on a top surface of the PCB 14 (e.g., electrically connected to conductive traces on the top surface of the PCB 14) and may be operatively connected to a light sensor controller 30 and a temperature sensor controller 32, respectively, that may be configured to manage the operation of, supply power to, and/or process output from the light emitter 16, light receiver 18, and temperature sensing element 20 as further described below. The light sensor controller 30 and temperature sensor controller 32 may be embodied by appropriately configured integrated circuits (ICs), for example. The PCB 14 may be connected to one or more electrical power sources and/or control elements (not shown) external to the housing 12 via conductors 28 that extend from the PCB 14 through a plug portion 34 of the housing 12.

The transparent compound 22 may partially or entirely fill a space in the housing 12 between the PCB 14 and the cover plate 26 and may substantially surround and encase each of the light emitter 16, the light receiver 18, the temperature sensing element 20, the light sensor controller 30, and the temperature sensor controller 32. The transparent compound 22 may be a fluid or semi-fluid material (e.g., a liquid or a gel) that is transparent to infrared and/or visible light and that has a refractive index that is substantially equal to that of glass. Particularly, the transparent compound 22 may have a refractive index that is substantially the same as that of the cover plate 26 and substantially the same as that of an automobile windshield (not shown) to which the cover plate 26 may be attached when the module 10 is operatively installed in an automobile. In various embodiments, the transparent compound 22 may have an index of refraction in the range of 1.45 to 1.55. More preferably, the transparent compound 22 may have an index of refraction in the range of 1.50 to 1.525. In various embodiments, the transparent compound 22 may be a silicone gel or liquid. The present disclosure is not limited in this regard.

Figure 2A:
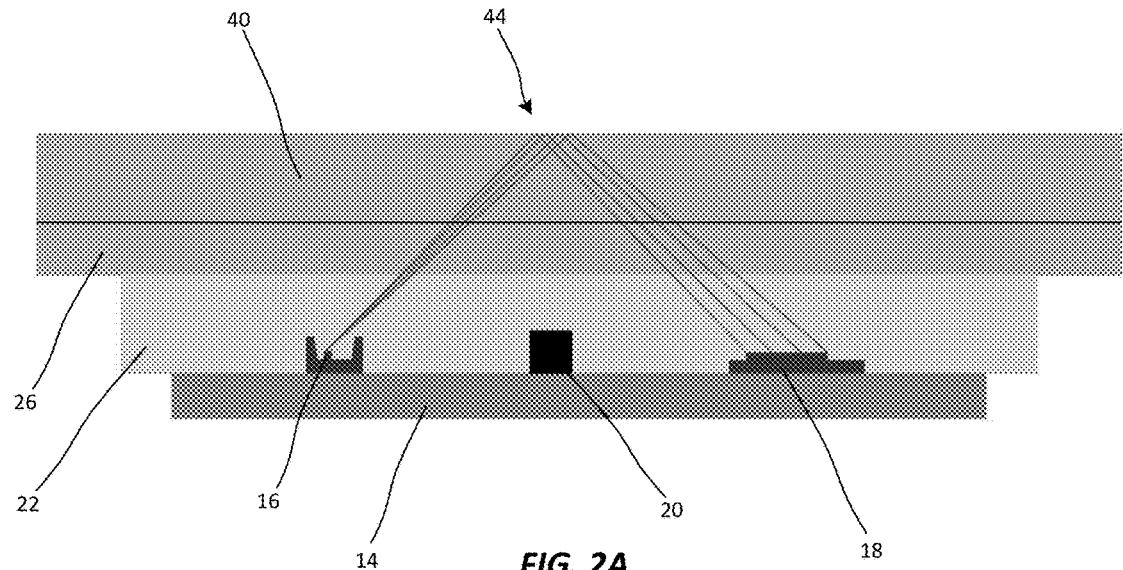
FIGS. 2A and 2B are cross-sectional side views illustrating certain components of the rain and temperature sensing module of FIGS. 1A and 1B during operation.
Figure 2B:
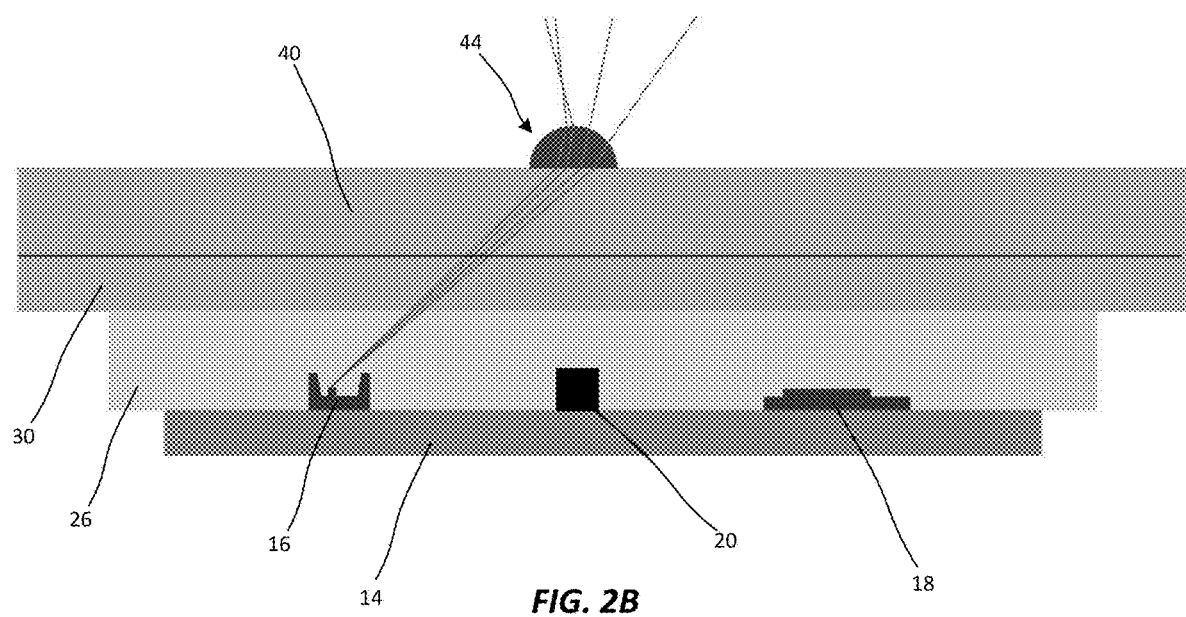

Referring to FIGS. 2A and 2B, cross-sectional side views illustrating the module 10 coupled to an interior surface of an automobile windshield 40 are shown. For clarity of description, only the PCB 14, light emitter 16, light receiver 18, temperature sensing element 20, transparent compound 22, and cover plate 26 of the module 10 are shown in FIGS. 2A and 2B. In various embodiments, the cover plate 26 may be fastened to the automobile windshield 40 by a thin layer of transparent adhesive (e.g., adhesive 42 shown in FIGS. 1A and 1B).

During operation of the module 10, and as shown in FIG. 2A, the light emitter 16, which may be a light emitting diode (LED), may emit a beam of light (e.g., infrared light) through the transparent compound 22, the cover plate 26, and the windshield 40 to a detection area 44 on an exterior surface of the windshield 40. If there is no water present at the detection area 44, most or all of the light emitted by the light emitter 16 will be reflected back through the windshield 40, the cover plate 26, and the transparent compound 22 onto the light receiver 18. The light receiver 18, which may be a photodiode, may generate an electrical output signal corresponding to the amount of received light. If there is water present at the detection area 44, most or all of the light emitted by the light emitter 16 will be refracted into and through the water as shown in FIG. 2B, and little or none of the light will be reflected back through the windshield 40, the cover plate 26, and the transparent compound 22 onto the light receiver 18. The light receiver 18 will therefore generate little or no corresponding electrical output signal. The output from the light receiver 18, which may be communicated to the light sensor controller 30 (FIG. 1B), may therefore be used to determine whether moisture is present on the windshield 40 and to dictate the operation of various automobile systems (e.g., windshield wipers, traction control, etc.).

Advantageously, since the space between the light emitter 16, light receiver 18, and the cover plate 26 is filled with the transparent compound 22 having a refractive index that is substantially equal to that of the cover plate 26 and to that of the windshield 40, the light emitted by the light emitter 16 may travel through the transparent compound 22, the cover plate 26, and the windshield 40 in a substantially straight line without being refracted at the boundaries therebetween. Thus, the module 10 of the present disclosure does not require any collimating or focusing lenses to accommodate the refraction of light at the juncture of the transparent compound 22 and the cover plate 26. The module 10 of the present disclosure may therefore be manufactured at a significantly lower cost relative to conventional automobile rain sensor modules in which collimating and/or focusing lenses are necessary for accommodating refraction. Additionally, the configuration of the light emitter 16 and light receiver 18 of the module 10 can be easily changed (e.g., in order suit various application environments in different vehicles) without necessitating any modifications to the housing 12, such as would be necessary in conventional automobile rain sensor modules for accommodating changes to the position and/or orientation of collimating and focusing lenses.

In addition to providing refraction-free optical coupling between the interior of the housing 12 and the cover plate 26 as described above, the transparent compound 22 may additionally provide a thermally conductive medium for communicating the temperature of the windshield 40 to the temperature sensing element 20. In a non-limiting example, the transparent compound 22 may have a thermal conductivity that is greater than the thermal conductivity of air at room temperature (e.g., greater than about 0.028 watts per meter-kelvin). In another example, the transparent compound 22 may have a thermal conductivity that is greater than 0.20 watts per meter-kelvin. Thus, heat from the windshield 40 may be conducted through the cover plate 26 and through the transparent compound 22 to the temperature sensing element 20. The temperature sensing element 20, which may be a thermocouple, negative temperature coefficient (NTC) element, resistance temperature detector, or similar device, may communicate a measured temperature of the windshield 40 to the temperature sensor controller 32 (FIG. 1B). The measured temperature may then be used to dictate the operation of various automobile systems (e.g., automatic defogging system).

Advantageously, the temperature sensing element 20 is implemented in the same housing 12 as the rain sensing elements of the module 10 and does not require any of the mechanical components (e.g., springs, flexible circuit boards, etc.) of conventional windshield temperature sensors. The temperature sensing element 20 of the module 10 may therefore be implemented at a significantly reduced cost and in a smaller form factor relative to conventional windshield temperature sensors. Additionally, due to the lack of mechanical components associated with the temperature sensing element 20, the temperature sensing element 20 is not susceptible to mechanical failure in the manner of conventional windshield temperature sensors.

While the module 10 has been described above as including both rain sensing elements and windshield temperature sensing elements, it is contemplated that, in various embodiments, the module 10 may be implemented as only a rain sensor module or only as a windshield temperature sensor module. That is, it is contemplated that only the rain sensing elements (i.e., the light emitter 16, light receiver 18, etc.) may be implemented while the windshield temperature sensing elements (i.e., the temperature sensing element 20 and the temperature sensor controller 32) are omitted, or that only the windshield temperature sensing elements may be implemented while the rain sensing elements are omitted. Notably, if only the windshield temperature sensing elements are implemented, then the transparent compound 22 may be replaced by another compound or other material having good thermal conductivity (e.g., a thermal conductivity that is superior to that of air) but that is not necessarily transparent.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A rain sensing module comprising:
   a housing including a cover plate formed of a transparent material;
   a printed circuit board disposed within the housing and having a light emitter and a light receiver disposed thereon, wherein the light receiver is configured to receive light emitted by the light emitter and reflected off of an automobile windshield; and
   a transparent compound disposed within the housing and filling a space between the printed circuit board and the cover plate, wherein the transparent compound contacts the cover plate and surrounds, and at least partially encases, the light emitter and the light receiver.

2. The rain sensing module of claim 1, wherein the cover plate is transparent to infrared light and opaque to visible light.

3. The rain sensing module of claim 1, wherein the transparent compound has a refractive index that is equal to a refractive index of the cover plate.

4. The rain sensing module of claim 1, wherein the transparent compound has a refractive index that is equal to a refractive index of automobile windshield glass.

5. The rain sensing module of claim 1, wherein the transparent compound has a refractive index in a range of 1.45 to 1.55.

6. The rain sensing module of claim 5, wherein the transparent compound has a refractive index in a range of 1.50 to 1.525.

7. The rain sensing module of claim 1, wherein the transparent compound is a liquid or a gel.

8. The rain sensing module of claim 1, wherein the transparent compound is formed of silicone.

\* \* \* \* \*